US010933915B2

(12) United States Patent
Peru

(10) Patent No.: US 10,933,915 B2
(45) Date of Patent: Mar. 2, 2021

(54) REINFORCEMENT OF THE FRONT STRUCTURE OF A MOTOR VEHICLE FOR FRONTAL CRASH WITH REDUCED OVERLAP

(71) Applicant: PSA Automobiles SA, Poissy (FR)

(72) Inventor: Marc Peru, Chatenay-Malabry (FR)

(73) Assignee: PSA AUTOMOBILES SA, Poissy (FR)

(*) Notice: Subject to any disclaimer, the term of this patent is extended or adjusted under 35 U.S.C. 154(b) by 14 days.

(21) Appl. No.: 16/342,500

(22) PCT Filed: Sep. 22, 2017

(86) PCT No.: PCT/FR2017/052556
§ 371 (c)(1),
(2) Date: Apr. 16, 2019

(87) PCT Pub. No.: WO2018/078226
PCT Pub. Date: May 3, 2018

(65) Prior Publication Data
US 2019/0256149 A1 Aug. 22, 2019

(30) Foreign Application Priority Data
Oct. 27, 2016 (FR) ...................................... 1660433

(51) Int. Cl.
*B62D 21/14* (2006.01)
*B62D 21/15* (2006.01)
(Continued)

(52) U.S. Cl.
CPC ........... *B62D 21/152* (2013.01); *B62D 25/04* (2013.01); *B62D 25/08* (2013.01); *B62D 25/082* (2013.01)

(58) Field of Classification Search
None
See application file for complete search history.

(56) References Cited

U.S. PATENT DOCUMENTS 8,469,442 B1 6/2013 Pencak et al.
9,487,236 B2 * 11/2016 Ozawa ................ B62D 25/082
(Continued)

FOREIGN PATENT DOCUMENTS

| EP | 1209068 A2 | 5/2002 |
| FR | 3002200 A1 | 8/2014 |
| JP | S6379280 A | 5/1988 |

OTHER PUBLICATIONS

International Search Report corresponding to PCT/FR2017052556 dated Dec. 6, 2017.
(Continued)

*Primary Examiner* — Lori L Lyjak
(74) *Attorney, Agent, or Firm* — Sandberg Phoenix & von Gontard, P.C.

(57) ABSTRACT

A reinforcement is provided for the front structure of a motor vehicle. The motor vehicle comprises, on at least at one side laterally to a longitudinal axis of said vehicle, a front wheel, a generally vertical profile member (the A-pillar) located to the rear of the front wheel, and a transverse wall (the wheel arch) adjacent to the A-pillar defining the passenger compartment of the vehicle. The reinforcement is attached to the A-pillar and to the wheel arch, and is configured to interfere with the front wheel to limit an intrusion of the wheel into the passenger compartment in the case of a frontal crash on a portion of the vehicle aligned with the front wheel. The reinforcement comprises a generally flat central portion extending transversely along the A-pillar and the wheel arch.

10 Claims, 2 Drawing Sheets

(51) Int. Cl.
*B62D 25/04* (2006.01)
*B62D 25/08* (2006.01)

(56) References Cited

U.S. PATENT DOCUMENTS

| | | | |
|---|---|---|---|
| 2014/0091593 A1 | 4/2014 | Obayashi et al. | |
| 2014/0375081 A1* | 12/2014 | Kuriyama | B62D 25/082 296/187.1 |
| 2015/0246692 A1* | 9/2015 | Rangaswamaiah | B62D 21/15 296/187.1 |
| 2015/0246697 A1* | 9/2015 | Kishima | B62D 35/00 296/180.1 |
| 2016/0052554 A1 | 2/2016 | Ozawa | |

OTHER PUBLICATIONS

Written Opinion corresponding to PCT/FR2017052556 dated Dec. 6, 2017.

* cited by examiner

REINFORCEMENT OF THE FRONT STRUCTURE OF A MOTOR VEHICLE FOR FRONTAL CRASH WITH REDUCED OVERLAP

CROSS-REFERENCE TO RELATED APPLICATIONS

This application is the US National Stage under 35 USC § 371 of International Application No. PCT/FR2017/052556, filed 22 Sep. 2017 which claims priority to French Application No. 1660433 filed 27 Oct. 2016, both of which are incorporated herein by reference.

BACKGROUND

The invention relates to the domain of motor vehicles and more particularly to the reinforcement of vehicles to stop a frontal shock.

In the context of a collision, the bumper plays a significant role in protecting the driver and front seat passenger. New frontal shock protocols with weak coverage are currently implemented and relate to collisions involving 25% of the front and side part of the vehicle. This type of shock does not allow efficient functioning of the overall bumper; actually, these shocks lead to a rotation of the front tire and pivoting of the front tire towards the passenger compartment, causing damage to the dash panel and, consequently, to the person positioned there within the vehicle. This is why the implementation of complementary structures eliminating or limiting the rotation of the front wheel is useful in improving passenger safety.

US 2014/0091593 A1 discloses a gusset plate placed within the passenger compartment behind the front pillar and the front wheel well, which is meant to reinforce the connection between the front wheel and the wheel well. This gusset plate is made up of a single piece and is solidly fixed to the underlying structure, thereby allowing the dash panel to remain intact. Even if it limits the reinforcement of the wheel within the passenger compartment, it does not prevent pivoting.

FR 3 002 200 A1 discloses a sliding surface positioned in front of the front pillar and consolidated in the front by a sliding surface. This sliding surface improves the sliding of the wheel to the outside in case of a frontal shock; however, the integration of these structures to the vehicle requires a modification, making its design more complex. Moreover, it does not allow the wheel to absorb the shock against the wheel well.

US 2015/0246692 A1 discloses a reinforcement for the front pillar of a motor vehicle. It is made up of a piece of sheet metal attached to the front pillar and the front wheel well. This reinforcement forms a bridge towards the wheel to engage it with the rim and to separate it following a frontal shock. This structure does not prevent the wheel from rotating inwards, which is actually necessary for it to be destroyed and to absorb the shock.

SUMMARY

It is an object of the invention to overcome at least one of the shortcomings of the above-mentioned prior art. More particularly, an object of the invention is to prevent the front wheel from destroying the integrity of the passenger compartment in case of a weakly reinforced impact to the front of the vehicle.

Briefly stated, a motor vehicle is disclosed which comprises on at least one side lateral to a longitudinal axis of the vehicle; a front wheel; a generally vertical section (or front pillar), positioned behind the front wheel; a transverse wall (or wheel well), adjacent to the front pillar and defining the passenger compartment of the motor vehicle; a reinforcement fixed to the front pillar and the wheel well, and configured to interact with the front wheel and limit intrusion of the wheel into the passenger compartment in case of a frontal collision on the part of the vehicle located at the front wheel; wherein the or each of the reinforcements comprises a central, generally flat portion extending transversely along the front pillar and the wheel well.

According to an advantageous embodiment, the central portion of the or each of the reinforcements comprises an interior lateral extremity with a rim intended to engage with the front wheel during a frontal collision.

Advantageously, the rim forms a generally vertical ridge. This ridge extends toward the front of the reinforcement.

According to an advantageous embodiment, the central portion of the or each of the reinforcements comprises a generally flat outside face positioned at a distance from the front pillar and the front wheel well.

Advantageously, the or each of the reinforcements comprises ribs generally extending longitudinally between the outside face on the one hand and the front pillar and the wheel well on the other hand, the ribs being supported by said front pillar and the wheel well.

The central portion can then have a thickness of between 1 and 3 mm, and in a preferred embodiment, a thickness of 2 mm. The rib network can have a diamond-shaped structure. This reinforcement may be fixed on the front wheel well and on the front pillar using several known techniques, notably bonding.

According to an advantageous embodiment, the ribs form a notch snugly fitting a vertical junction rabbet made of sheet metal in front of the corresponding front pillar.

The reinforcement can be built using different materials, notably a composite plastic material, e.g., BMC (bulk molding compound), SMC (sheet molding compound), or fiberglass. This type of reinforcement has a shock absorption function due to the compression of the composite box.

Advantageously, the or each of the reinforcements comprises two lateral portions on each side of the central portion, the lateral portions extending primarily longitudinally and being supported by the front pillar and the wheel well, respectively.

According to an advantageous embodiment, the two lateral portions of the or each of the reinforcements are fixed to the front pillar and to the wheel well, respectively.

These can be fixed through soldering. They can possibly be fixed by bonding the reinforcement to the front pillar and the front wheel well of the motor vehicle.

Advantageously, the or each of the reinforcements comprises a sheet metal element, preferably in one piece.

According to an advantageous embodiment, the or each of the reinforcements comprises a pin protruding from the central portion towards the back of the vehicle, the pin engaging in a corresponding orifice of a sheet metal element fixed to the front pillar and the wheel well.

The sheet metal element is advantageously fixed on the structure using known fixation methods, e.g., soldering. The reinforcement can be made of a plastic material. This configuration allows for a shock absorption function due to the compression of the plastic material.

The measurements of the vehicle and reinforcement are significant in that they allow reinforcement of the front structure of a motor vehicle, due to an added piece that is both light and easy to manufacture. This reinforcement can be easily integrated to vehicles intended for certain markets, such as the USA and China, with particular demands for the frontal shocks with limited covering, without modifying the vehicle design. This reinforcement allows better protection of the vehicle passengers because it allows the impact of the wheel on the front wheel well to be absorbed and its rotation toward the passenger side is prevented.

DESCRIPTION OF THE FIGURES

Other characteristics and advantages of the present invention will be better understood with the description and drawings, including the following.

DETAILED DESCRIPTION

Figure 1:
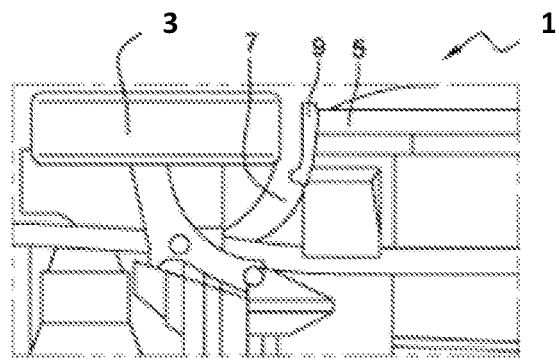
FIG. 1 is a partial view of the underside of the front of a motor vehicle showing a reinforcement.

FIG. 1 is a view of the underside of a motor vehicle 1. In the front and lateral parts of the vehicle, there is a front wheel 3, behind which is positioned a molded plastic structure corresponding to the lower portion of a front pillar 5. Positioned behind the wheel and in front of the pillar is an element that is slightly curved toward the inside of the vehicle, corresponding to the wheel well 7. It is at this wheel well that a reinforcement 9 is located.

Figure 2:
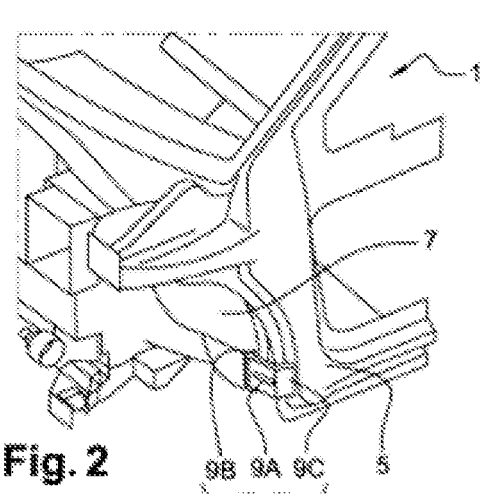
FIG. 2 is a perspective view of a first embodiment of the reinforcement between the wheel well and the front pillar of a motor vehicle.
Figure 3:
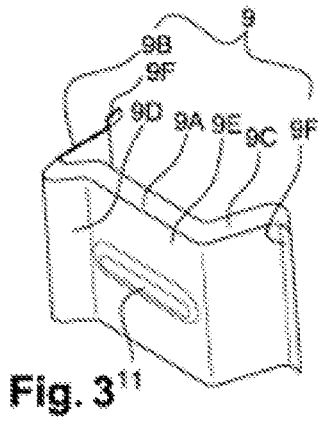
FIG. 3 is a perspective view of the reinforcement from FIG. 2.
Figure 4:
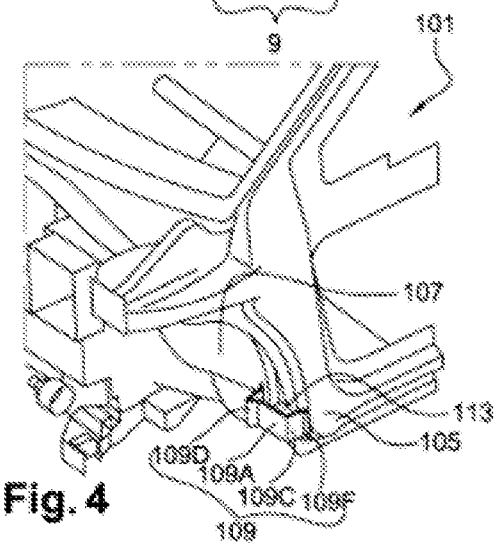
FIG. 4 is a perspective view of a second embodiment of the reinforcement between the wheel well and the front pillar of a motor vehicle.

FIGS. 2 and 3 show the reinforcement 9 according to a first embodiment. This reinforcement comprises several portions: a lateral portion 9B fixed on the wheel well 7, a central portion 9A extending transversely between the pillar 5 and the front wheel well 7, and a side portion 9C fixed on the front pillar 5. The central portion 9A is generally flat. It can have a length of between 70 mm and 150 mm, more preferably between 90 mm and 130 mm. The central portion 9A of the reinforcement has, at its lateral interior extremity positioned toward the wheel well 7 of the vehicle, a rim 9D. This rim 9D has the particularity of having a ridge-shaped structure, which is directed toward the back of the vehicle. The central portion 9A can have a longitudinal stiffening element 11, preferably positioned in the middle and all along the outside face 9E. Finally, this reinforcement 9 can have dropped edges 9F, which are positioned at the extremities of the lateral portions 9B and 9C of the reinforcement. These dropped edges 9F form tabs allowing the reinforcement 9 to be fixed on both the pillar 5 and the front wheel well 7 of the vehicle 1. This reinforcement can be fixed using known methods, e.g. soldering. The reinforcement is, in this embodiment, preferably made of pressed sheet metal and more particularly DP450 steel.

FIGS. 4 to 7 show a reinforcement 109 according to a second embodiment. These figures use the same numbering method from the preceding figures for identical or similar elements, the numbering being increased, however, by 100. Furthermore, reference is made to the description of these elements in relation to the first embodiment. Specific numbers between 100 and 200 are used for elements specific to this embodiment. This reinforcement 109 has a central portion 109A, two lateral portions 109B and 109C, as well as a rim 109D and dropped edges 109F as described above. This reinforcement also has the particularity of having a pin 113, which will be described in greater detail in relation to FIGS. 6 and 7, and which is directed toward the back of the reinforcement 109 to fit into a sheet metal element 115.

Figure 5:
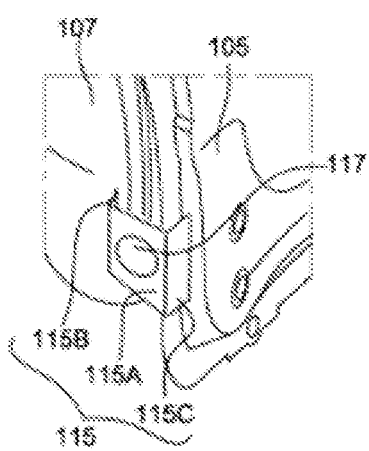
FIG. 5 is a perspective view of a sheet metal element of the reinforcement between the wheel well and the front pillar of a motor vehicle.
Figure 6:
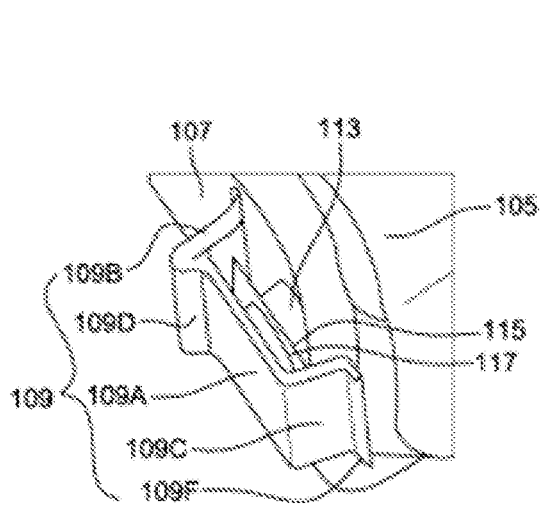
FIG. 6 is an enlargement of the perspective view of the reinforcement from FIG. 4.
Figure 7:
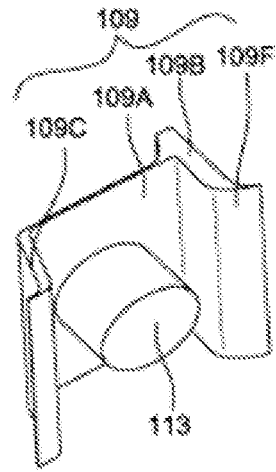
FIG. 7 is a perspective view of the reinforcement from FIG. 6.

FIG. 5 shows this sheet metal element 115 with greater precision. It has a structure similar to the reinforcement 9 from FIGS. 2 and 3, with a central portion 115A and two lateral portions 115B and 115C, respectively, intended to attach the element 115 to the wheel well 107 and to the front pillar 105 of the vehicle 101. This metallic element also has an orifice 117, into which allow the pin 113 of the reinforcement 109 can be inserted. This orifice preferably has an ovoid shape, but must correspond to the shape of the pin 113 to allow proper engagement of these two elements.

The reinforcement 109 is positioned in front of the structure. It is advantageously made of a plastic material (BMC: bulk molding compound) or of dense polypropylene foam. It has a wall thickness preferably of between 2 mm and 3 mm, and, according to a preferred embodiment, its wall has a thickness of 2.5 mm. On the inside face of the central portion of the reinforcement 109 is the pin 113, preferably having an ovoid shape and corresponding to the shape of the orifice 117 of the sheet metal element 115 described in FIG. 6. This reinforcement 109 and the pin 113 are preferably made in one piece.

Figure 8:
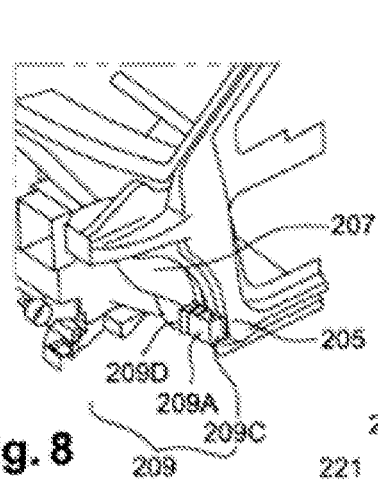
FIG. 8 is a perspective view of a third embodiment of the reinforcement between the wheel well and the front pillar of a motor vehicle.
Figure 9:
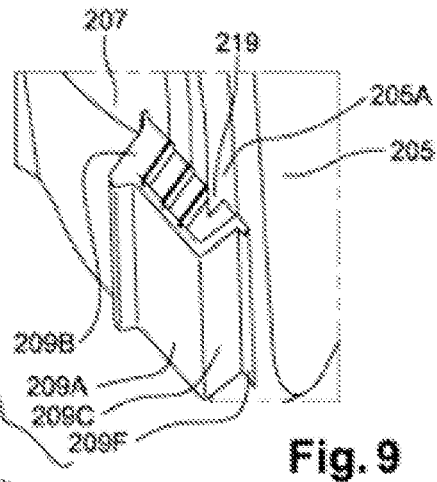
FIG. 9 is an enlargement of the perspective view of the reinforcement from FIG. 8.
Figure 10:
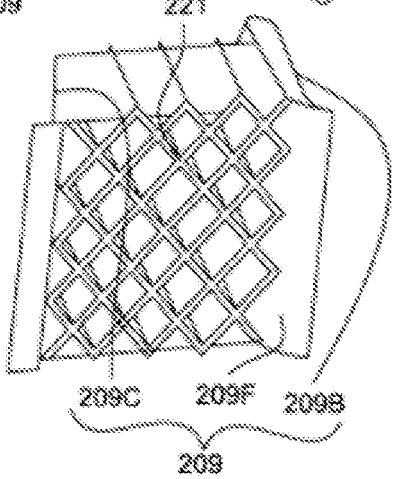
FIG. 10 is a perspective view of the reinforcement from FIGS. 8 and 9.

FIGS. 8 to 10 show a reinforcement 209 according to a third embodiment. These figures use the same numbering method from FIGS. 2 and 3 for identical or similar elements, the numbering being increased, however, by 200. Furthermore, reference is made to the description of these elements in relation to the first embodiment. Specific numbers between 200 and 300 are used for elements specific to this embodiment. This reinforcement 209 has all the characteristics of the reinforcement 9 described in the first embodiment.

The reinforcement 209 has ribs 221 positioned on the inside face of the central portion 209A of the reinforcement. As with the reinforcements 9 and 109, the reinforcement 209 includes lateral portions 209B and 209C, a rim 209D, and dropped edges 209F. These ribs 221 are also attached to the two lateral portions of the reinforcement 209B and 209C and form a mesh network. This network will allow the reinforcement 209 to solidify. This reinforcement 209 also has a notch 219, more particularly visible in FIG. 9, which allows the reinforcement to be integrated onto a vertical rabbet 205A of the front pillar 205 of the vehicle. The reinforcement 209 is fixed onto the front pillar 205 and onto the wheel well 207 through bonding, for example. It can be made of a composite, BMC material (bulk molding compound), or SMC (sheet molding compound), or fiberglass. Its wall preferably has a thickness of between 1.5 mm and 2 mm, and, in a preferred embodiment, a thickness of 2 mm.

The invention claimed is:

1. A motor vehicle comprising, on at least one side lateral to a longitudinal axis of said vehicle:
   a front wheel;
   a generally vertical section, also called a front pillar, positioned behind the front wheel;
   a transverse wall, also called a wheel well, adjacent to the front pillar and delimiting the passenger compartment of the motor vehicle;
   a reinforcement fixed to the front pillar and the wheel well, and configured to interact with the front wheel and limit intrusion of said wheel into the passenger compartment in case of a frontal collision impacting a part of said vehicle located at the front wheel;
   wherein, the reinforcement comprises a central, generally flat portion extending transversely along the front pillar and the wheel well; the central portion of the reinforcement comprising an interior lateral extremity with a rim intended to engage with the front wheel during the frontal collision.

2. The vehicle according to claim 1, wherein the rim forms a generally vertical ridge.

3. The vehicle according to claim 1, wherein the central portion of the reinforcement comprises a generally flat outside face positioned at a distance from the front pillar and the wheel well.

4. The vehicle according to claim 3, wherein the reinforcement comprises ribs generally extending longitudinally between the outside face on the one hand and the front pillar and the wheel well on the other hand, said ribs being supported by said front pillar and said wheel well.

5. The vehicle according to claim 4, wherein said ribs form a notch snugly fitting a vertical junction rabbet made of sheet metal in front of the corresponding front pillar.

6. The vehicle according to claim 1, wherein the reinforcement comprises two lateral portions on each side of the central portion, said lateral portions extending primarily longitudinally and being supported by the front pillar and the wheel well, respectively.

7. The vehicle according to claim 6, wherein the two lateral portions of the reinforcements are fixed to the front pillar and to the wheel well, respectively.

8. The vehicle according to claim 1, wherein the reinforcement comprises a sheet metal element.

9. The vehicle according to claim 1, wherein the reinforcement comprises a pin protruding from the central portion towards the back of the vehicle, said pin engaging in a corresponding orifice of a sheet metal element fixed to the front pillar and the wheel well.

10. The vehicle according to claim 8 wherein the sheet metal element is formed in one piece.

* * * * *